(12) United States Patent
Haenel et al.

(10) Patent No.: US 9,342,364 B2
(45) Date of Patent: May 17, 2016

(54) WORKFLOW MANAGED COMPOSITE APPLICATIONS

(75) Inventors: Walter Haenel, Holzgerlingen (DE); Stefan Hepper, San Jose, CA (US); Thomas Stober, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1973 days.

(21) Appl. No.: 12/388,168

(22) Filed: Feb. 18, 2009

(65) Prior Publication Data

US 2009/0260021 A1    Oct. 15, 2009

(30) Foreign Application Priority Data

Apr. 9, 2008   (EP) .................................. 08154231

(51) Int. Cl.
*G06F 15/177*   (2006.01)
*G06F 9/50*   (2006.01)
*G06F 9/48*   (2006.01)

(52) U.S. Cl.
CPC .............. *G06F 9/5038* (2013.01); *G06F 9/485* (2013.01); *G06F 2209/482* (2013.01)

(58) Field of Classification Search
USPC .................................................. 709/220–222
See application file for complete search history.

(56) References Cited

U.S. PATENT DOCUMENTS

| | | | |
|---|---|---|---|
| 2004/0138939 A1* | 7/2004 | Theiler | 705/8 |
| 2006/0265393 A1* | 11/2006 | Agassi et al. | 707/10 |
| 2010/0257261 A1* | 10/2010 | Wallis et al. | 709/222 |
| 2011/0099256 A1* | 4/2011 | Pace et al. | 709/221 |
| 2011/0137702 A1* | 6/2011 | Hodges et al. | 705/7.27 |

* cited by examiner

*Primary Examiner* — Jason Recek
(74) *Attorney, Agent, or Firm* — Patents on Demand P.A.; Brian K. Buchheit; Scott M. Garrett

(57) ABSTRACT

A portal view generation system can receive a request from a user for a portal view of a portal site. The system determines which resources the user can access based on the user's permission level on the resources. The system further determines the user's authentication level. Each of the portal resources the user has permission to access are then vetted based on a minimum authentication level needed to view the resource, and the user's authentication level. Those resources which the user has permission to access, but in insufficient level of authentication are excluded from view. The portal view generation system then generates the code to render navigational elements for the user to access those remaining resources the user has both permission and sufficient authentication level to access.

19 Claims, 6 Drawing Sheets

WORKFLOW MANAGED COMPOSITE APPLICATIONS

CROSS-REFERENCE TO RELATED APPLICATION

This application claims the benefit of European Patent Application No. 08154231.8 filed 9 Apr. 2008, which is assigned to the assignee of the present application, and the teachings of which are hereby incorporated by reference in their entirety.

BACKGROUND OF THE INVENTION

The present invention relates to the field of web based programs, and in particular to a method and system for performing the lifecycle management such as deployment, instantiation, running and removal of a web based application.

In FIG. 1 (Prior Art), a zoom-out view to a Portal server and a business user using a composite web application is given. The user interacts with a portal page 10 as one application. The portal page itself is composed out of different portlets 12A-G that may connect to different back end systems 14 to 20. For example back end systems can include a computer Customer Relationship (CRM) system 14, a Supply Chain Management (SCM) system 15, a content management system 16, a collaboration system 17, a medical workflow system 18 using electronic Health Records (eHR), a syndicated Content system 19, and a web services system 20. A portal server integrates these portlets on different levels (e.g., by allowing to exchange events or single sign-on) into one consistent composite application to the end-user.

Prior art composite applications allow to group together different artifacts such as portlets, pages, wires, communities, back-end services, into one package that can be installed and deployed as one artifact. The prior art implementations of composite applications deal with composite applications on a artifact level that allows users to create the different artifacts, such as portlets and pages, and then group these artifacts together into one composite application.

FIG. 2 (Prior Art) illustrates the most basic structural components of a prior art hardware and software environment used for a prior art method of lifecycle management. The lifecycle is depicted to extend from left to right covering some "columns", beginning with deployment, continuing with Instantiation, Runtime, (i.e., execution), and finally the removal of the web based application. Each lifecycle stage (i.e., each column) uses the functional components, or tools as depicted at the left hand margin of the figure, as row indications. These are custom or standard services, a skeleton process, custom plug-in processes, application roles, membership roles, and Portal roles. At the cross point for a given column and row the tool or person, respectively, is indicated which is required to do the respective work.

One prior art technology in this area is defined by so-called OSGi Bundles, that define well-known methods for managing the lifecycle of an application after deployment (start, stop, update). However, these lifecycle methods do not deal with deployment, backup or error recovery with compensation models.

Since the composite applications, which are based on a set of common services, can integrate and require arbitrary other services, an installation support on the server, as for example for J2EE applications, is not sufficient for this job. As can be seen especially on the JavaEE example, this prior art approach leads to the limitation, that servers can only consume well defined applications. If the application needs more support than currently defined, all servers need to be updated to support the new definitions. Thus, having the installation controlled only by the consuming server is too limiting for composite applications. To solve this problem, the installations steps could theoretically be placed in the composite application. This of course leads to a great overhead in the composite applications, since standard installation steps would be needed to be added to each composite application.

To avoid both disadvantages, in general one could expect the installation support to be distributed across server and composite application. Sometimes even this would not be sufficient, in the case the installation of additional backend systems is required, which can not be controlled by the composite application itself. In this case it might be required, that both installations are done in parallel steps, which interact with each other. This, however, leads to situations, where one has to document complex manual procedures. Further, a lot of business application users fail, since the complexity can not be handled easily enough.

Thus, in summary, the disadvantage exists that there is much work to be done manually, which requires a lot of skill of the person doing this. Further, the work is error prone because there are in general many details to be considered when managing the whole lifecycle of a web based application.

BRIEF SUMMARY

A portal view generation system can receive a request from a user for a portal view of a portal site. The system determines which resources the user can access based on the user's permission level on the resources. The system further determines the user's authentication level. Each of the portal resources the user has permission to access are then vetted based on a minimum authentication level needed to view the resource, and the user's authentication level. Those resources which the user has permission to access, but in insufficient level of authentication are excluded from view. The portal view generation system then generates the code to render navigational elements for the user to access those remaining resources the user has both permission and sufficient authentication level to access.

DETAILED DESCRIPTION

Figure 1:
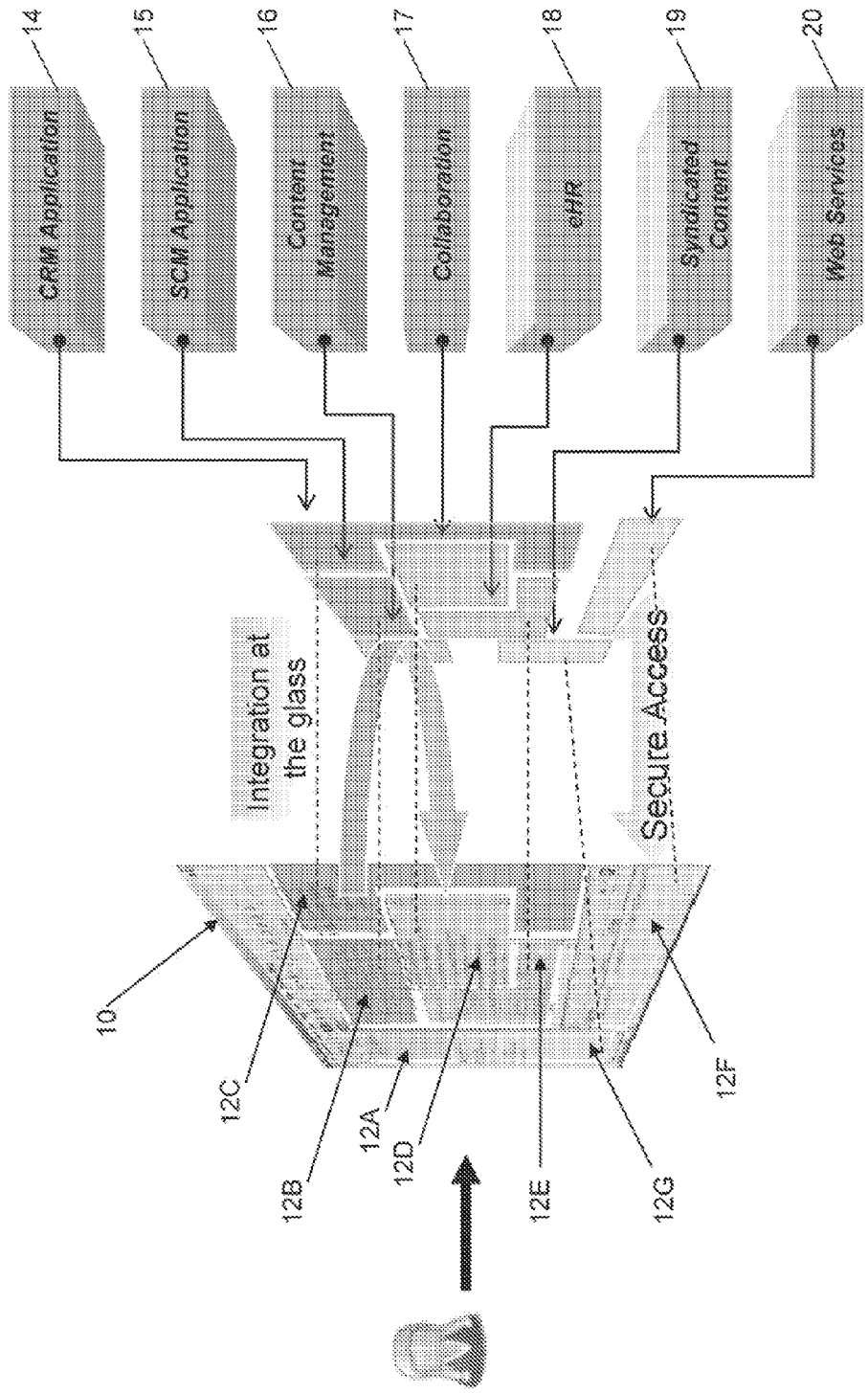
FIG. 1 (Prior Art) illustrates a zoom-out view to a Portal server and business user using a composite web application.
Figure 2:
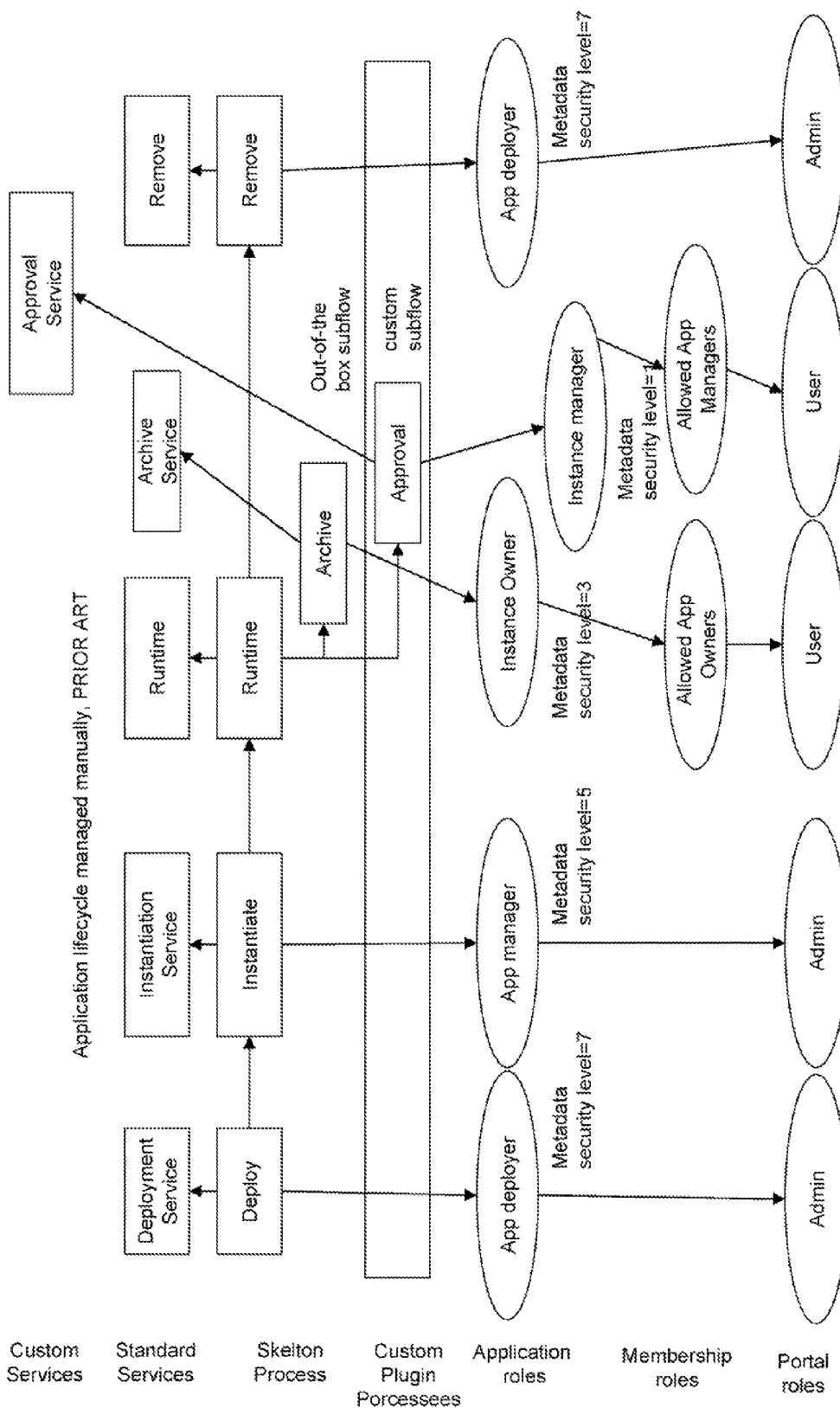
FIG. 2 (Prior Art) illustrates structural components of a prior art hardware and software environment used for a prior art method.

An embodiment of the disclosure can create applications that are not artifact-based, but that are based on a workflow, or a set of workflows. The disclosure provides a means to create a workflow managed lifecycle process, such as deploy/install, update, backup, de-install, as well as using workflows inside the application.

Thus, the application lifecycle can be modeled as an extensible workflow. This allows the application to provide exactly the workflow needed for this specific application. It further allows the application to provide compensation rules in case on step fails (e.g., if a backup fails due to a lack of resources).

In one embodiment, a disclosure allows a late binding of workflow-defined roles to users. It allows audit logs in each workflow stage, whereas the prior art implements static state machines. The disclosure introduces extension points for custom applications, based on generic templates that can be the same for a complete set of applications. These extension points need to be processed for all applications, and do allow for compensation.

In the disclosure, lifecycle management can include steps to deploy, instantiate, execute, update and remove steps of a web based application, a composite application, SCA (Service Component Architecture) application, or a JavaEE application. The runtime environment of the application can be provided by a web application server. The applications can include a set of artifacts implemented on the application server. The lifecycle management can include controlling the relevant stages of the lifecycle by a workflow driven control program. The workflow can drive the lifecycle of the artifacts on the web application server, such as instantiating the objects.

In one embodiment, stages of the lifecycle can include deployment of the web based application, instantiation of the web based application, executing (running) the web based application, updating the web based application, removing the web based application. In one embodiment, the web based application can be a composite application, a SCA application, and a JavaEE application.

In one embodiment, an application programmer can be provided with a capability to add functional components to the web based application. In one embodiment, BPEL can be used for implementing the workflow-related aspects of the present invention.

It should be noted that when utilizing one embodiment of the disclosed inventive arrangements, it can be easier to define (compared to prior art) how to create, manage, remove, backup a composite application as a step-by-step workflow. Further, componentized management of composite applications can be enabled that is task-oriented (e.g. update, backup) and not component-oriented. This can be a major improvement for development and testing, since the tasks can be mapped to use cases.

Additionally, default components can be defined for most common management tasks. Components available in existing runtime system, such as backup facilities, can be utilized via pre-defined services. These components can also provide their own services via plug-points in the defined workflow. Existing workflow tools can be reused.

Different composite applications can be aggregated into larger composite applications. Different workflows of an aggregated composite application and sub-composite applications can be managed, updated, backed-up, and the like. Thus, business users of the web based application can be allowed to customize the procedures according to their particular needs, by changing the process definitions.

In one embodiment, install processes can be enhanced with default parameters for a specific customer, or the integration of customer specific backend systems can be added to the process. Even processes may be added, that customize/extend the current application for the specific customer.

In one embodiment, the disclosed inventive arrangement can allows for a more fine grained application management. For example, business users are allowed to deploy new code, but as an additional step in the workflow process the portal "admin person" needs to approve this new application before end users can use the application. In one embodiment, compensation can occur if one of the steps in the process fails (e.g., due to dependencies on different installed components, or due to backend systems that are not available). For example, the compensation may select a service with a lower quality of service specification instead.

In one embodiment, the inventive arrangements can fit snugly into the Service Oriented Architecture (SOA) concept that allows one to have services that can be aggregated into larger services. The inventive arrangements can extend SOA which is focused on the functional side of applications to the operational side. Thus, by means of the inventive arrangements disclosed herein new services can not only be integrated functionally, but will also be integrated into the operations of the overall SOA-based system by integrating the workflow attached to the composite application into the overall operational workflow of the SOA-based system.

In prior art daily practice one is seldom able to create generic components that can be reused in different applications without any changes required thereof, as different roles, services, and workflows are factored into a respective component. In this regard, additional advantages arise due to the de-composition of the application into different workflow components into the involved services and roles. Hence, an application can be described in a much more generic manner. Thus, the reuse potential of single components across applications is higher than when using prior art techniques.

The following features are able to be used therein according to various embodiments of the invention. One feature is lifecycle management. Lifecycle management provides a defined process for install, update, backup, and delete of applications. One embodiment allows users to open up lifecycle management to business users. One embodiment allows for defining different quotas, such as number of applications, and/or resources required by applications. In one embodiment, the application developer now defines the lifecycle of his application.

The following example is given for creating an exemplary "teamspace" application. An ability to define the lifecycle process for teamspaces, can include the lifecycle stages needed to install, instantiate, run, update, backup, and remove. In one embodiment, different business components can be assigned to the different lifecycle steps that get executed. The portal can provide a pre-defined set of lifecycle management components.

In the install lifecycle stage, in one embodiment, a portal default install component can be re-used. A business user can be allowed to submit an install request for an application. After approval, the application can be installed. After successful install, a notice can be sent to a portal admin to approve the new application for specific user groups. The application can be made available to approved end users in the application catalogue.

In the instantiate lifecycle stage, in one embodiment, workflows can be implemented as BPEL processes and packaged into one large workflow and put into an EAR file that gets automatically deployed in a Web Sphere Application Server (WAS). The workflow gets started automatically by the WAS. A portal default instantiate composite application can be reused based on template.xsd. The needed pages, portlets, wires can be created. Additional workflow for Points of Variability (PoV) can be added for backup purposes. A user can be allowed to say that teamspace should be backed-up every x weeks. A request can be sent to the portal admin that needs to approve this backup request as this will take a large amount of system resources and may not be approved for all users and all teamspaces.

In the execute/run lifecycle stage, in one embodiment, a subprocess can define how to create a new teamspace.

Figure 3:
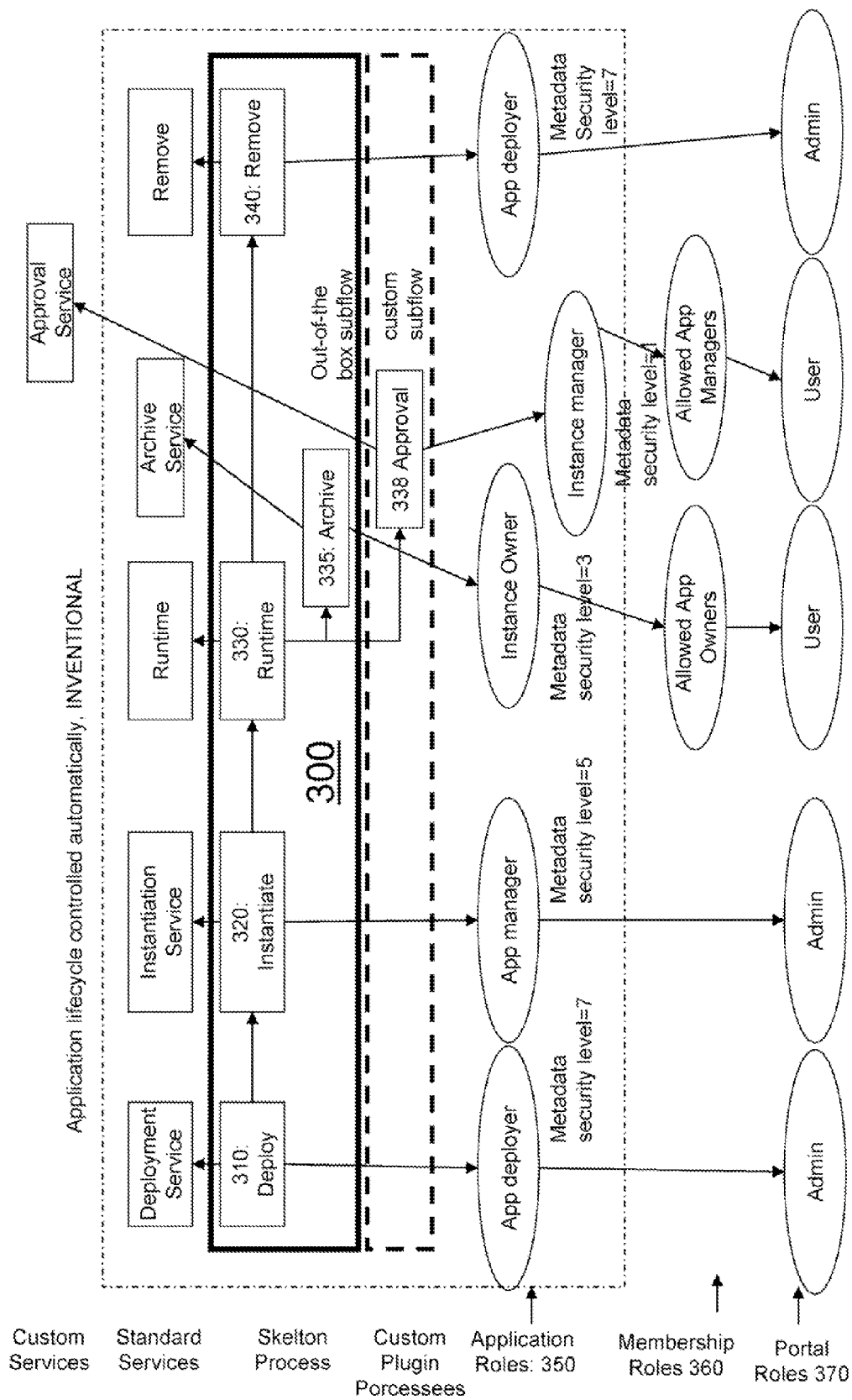
FIG. 3 illustrates structural components of a hardware and software environment used for an embodiment of the inventive arrangements disclosed herein.

With general reference to the figures and with special reference now to FIG. 3 an overview of the application lifecycle workflow according to an embodiment of the invention is provided. The composite application is "wrapped" (i.e., embedded according to this invention into a workflow based process 300). The workflow consists of the following different workflow stages that include Deploy stage 310, Instantiate stage 320, Runtime stage 330, and Remove stage 340.

All of these workflow stages may have additional sub-workflows, as depicted, for example, in the Runtime stage with Archive step 335 and Approval step 338.

A base skeleton can be provided as a pattern that the application can use and extend with additional workflow steps and services. Each workflow step also defines specific roles that are involved in this workflow step as application roles 350.

These roles 350 get mapped to membership roles 360 and finally to portal roles 370, as the deployment target of the disclosed method can be a portal server.

Figure 4:
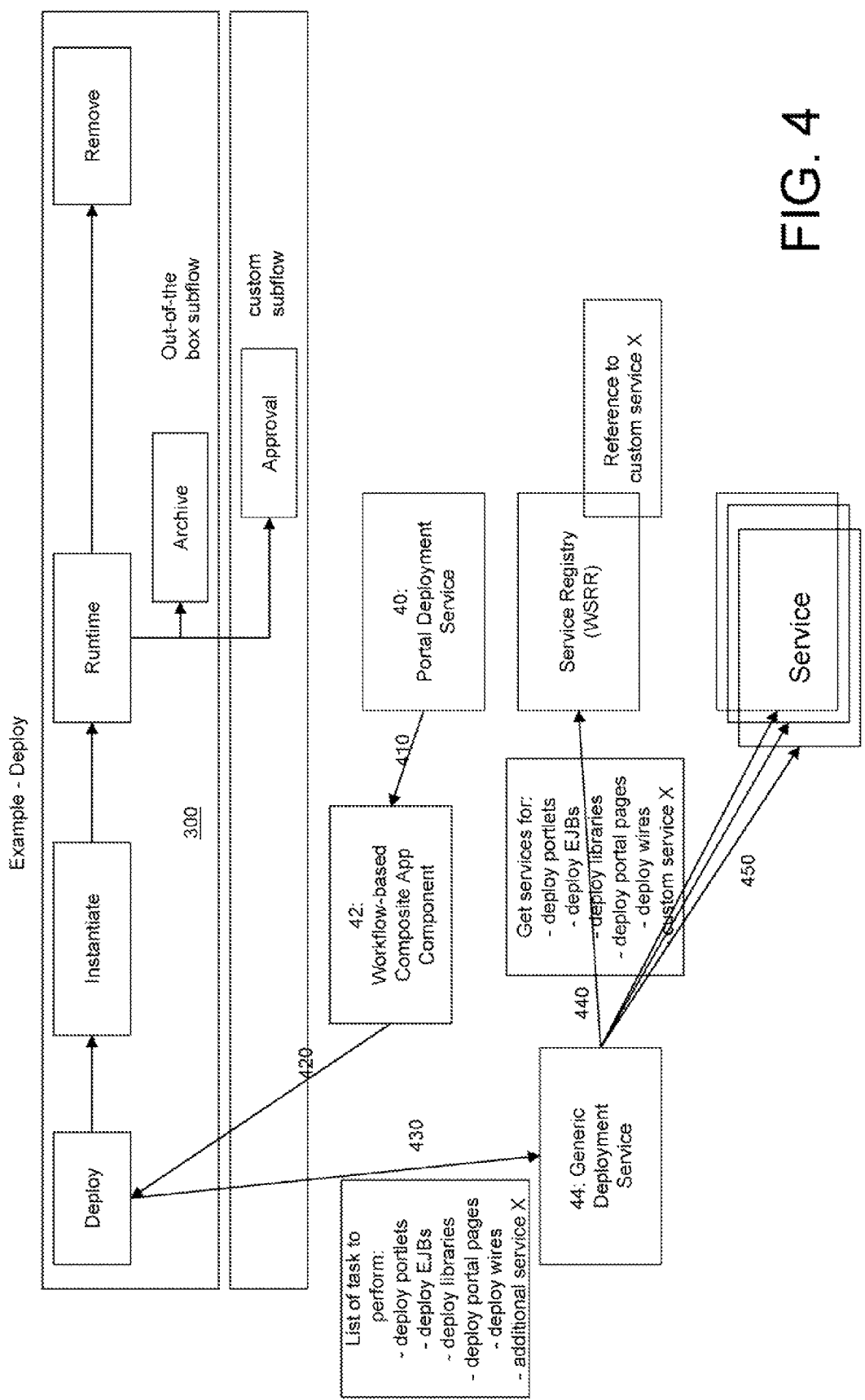
FIG. 4 provides an example for the control flow of a deploy stage in accordance with an embodiment of the inventive arrangements disclosed herein.

FIG. 4 provides an example for the control flow of the Deploy stage in the overall workflow. The reference signs indicate the sequence of the steps that are performed.

In Step 410, a portal deployment service 40 recognizes that it deals with a workflow lifecycle based application according to the invention, and thus calls a provided workflow-based composite application component 42.

In Step 420, the workflow-based composite application component 42 calls the first stage in the overall lifecycle, which is the Deploy stage.

In Step 430, the component implementing the Deploy stage references the generic Deployment service 44 provided by the lifecycle template and provides this service with the list of artifacts to deploy.

In Step 440, the deployment service 44 now requests for each artifact a service to deploy this artifact (e.g., via a prior art registry similar to WSRR (IBM WebSphere Service Repository and Registry)). Note that the composite application can provide additional services that would plug into the registry for deploying specific artifacts and thus the composite application is not limited to the pre-defined deployment services.

In step 450, the deployment service calls the service returned by the registry to deploy a specific artifact.

Figure 5:
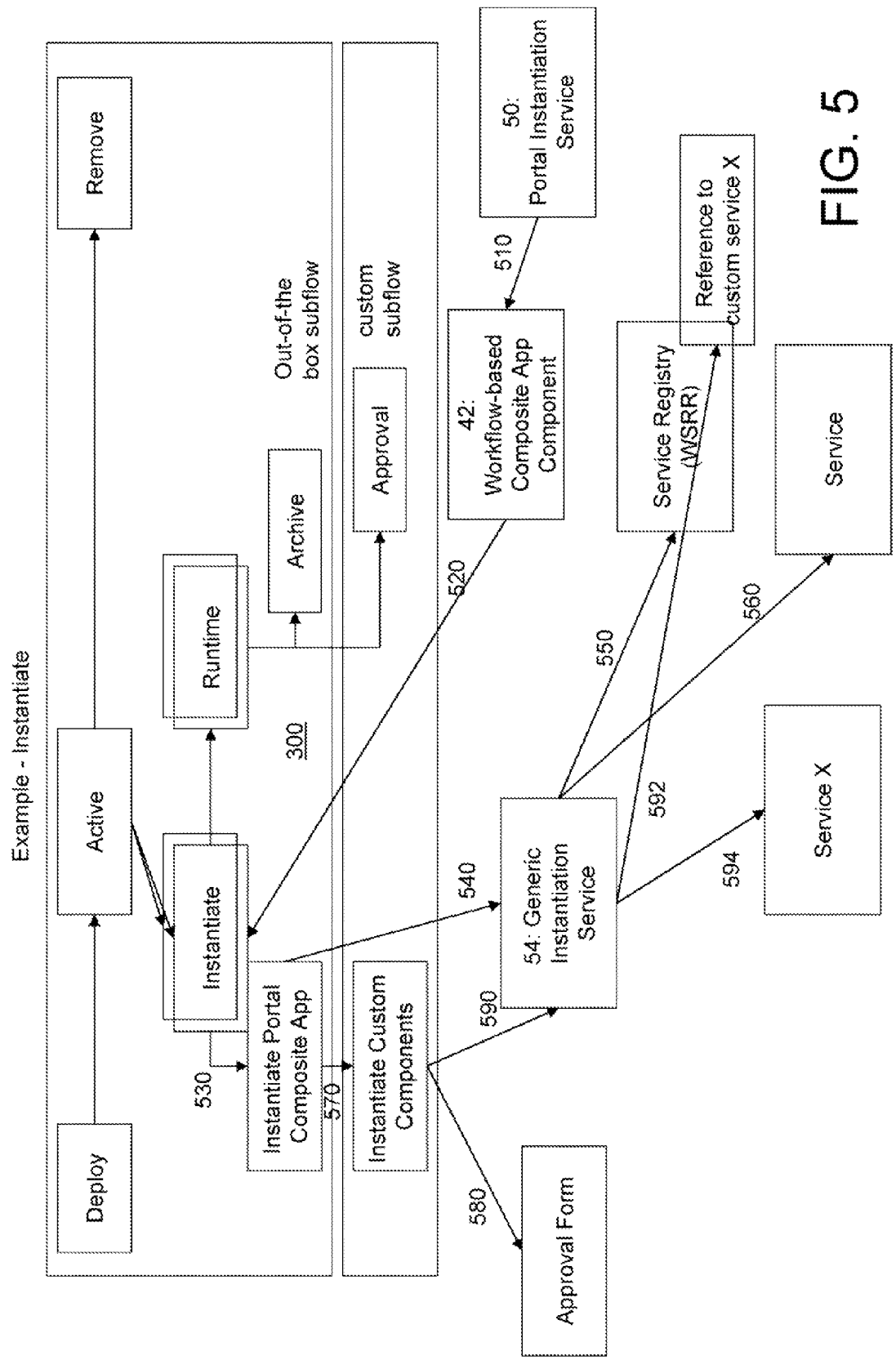
FIG. 5 provides an example for the control flow of an instantiation stage in accordance with an embodiment of the inventive arrangements disclosed herein.

FIG. 5 provides an example for the Instantiation stage.

After the deployment was successful the application gets active and is put into the instantiation state. The control flow is similar to the one above illustrated with reference to FIG. 4, but this example has an additional custom workflow step to initiate custom workflow components that require an additional approval that is triggered via the approval form.

In Step 510, a portal instantiation Service 50 recognizes that it deals with a workflow lifecycle based application according to an embodiment of the invention, and thus calls the provided workflow-based composite application component 42, already mentioned above.

In Step 520, the workflow-based composite application component 42 calls the second stage in the overall lifecycle, which is the Instantiate stage.

In step 530, the portal composite application instantiate workflow is triggered and starts triggering the instantiation process for all standard components of this composite application.

In Step 540, the component implementing the instantiate stage references the generic Instantiation service 54 provided by the lifecycle template and gets the service needed for the instantiation from the service registry 550 and executes the service 560. In one embodiment, step 550 corresponds to step 440 above, and step 560 corresponds to step 450 above.

In Step 570, if the composite application has custom components it can provide its own instantiation workflow as a sub-workflow of step 540.

In Step 580, the custom instantiation workflow may also contain additional workflows, such as an approval workflow. For instance, for a teamspace composite application that requires creating new entries and requesting space in a database, an administrator may need to approve that this space is provided.

In Step 590. after the approval is provided the custom instantiation mechanism calls the generic instantiation service. The instantiation service connects to the service registry for getting the custom instantiation service 550.

In Step 592, the composite application provides its custom instantiation service via a plug-point of the service registry to the generic service registry 550.

In Step 594, the custom instantiation service gets executed and instantiates the custom parts of the composite application (e.g., creating a folder in a database for storing teamspace documents).

Figure 6:
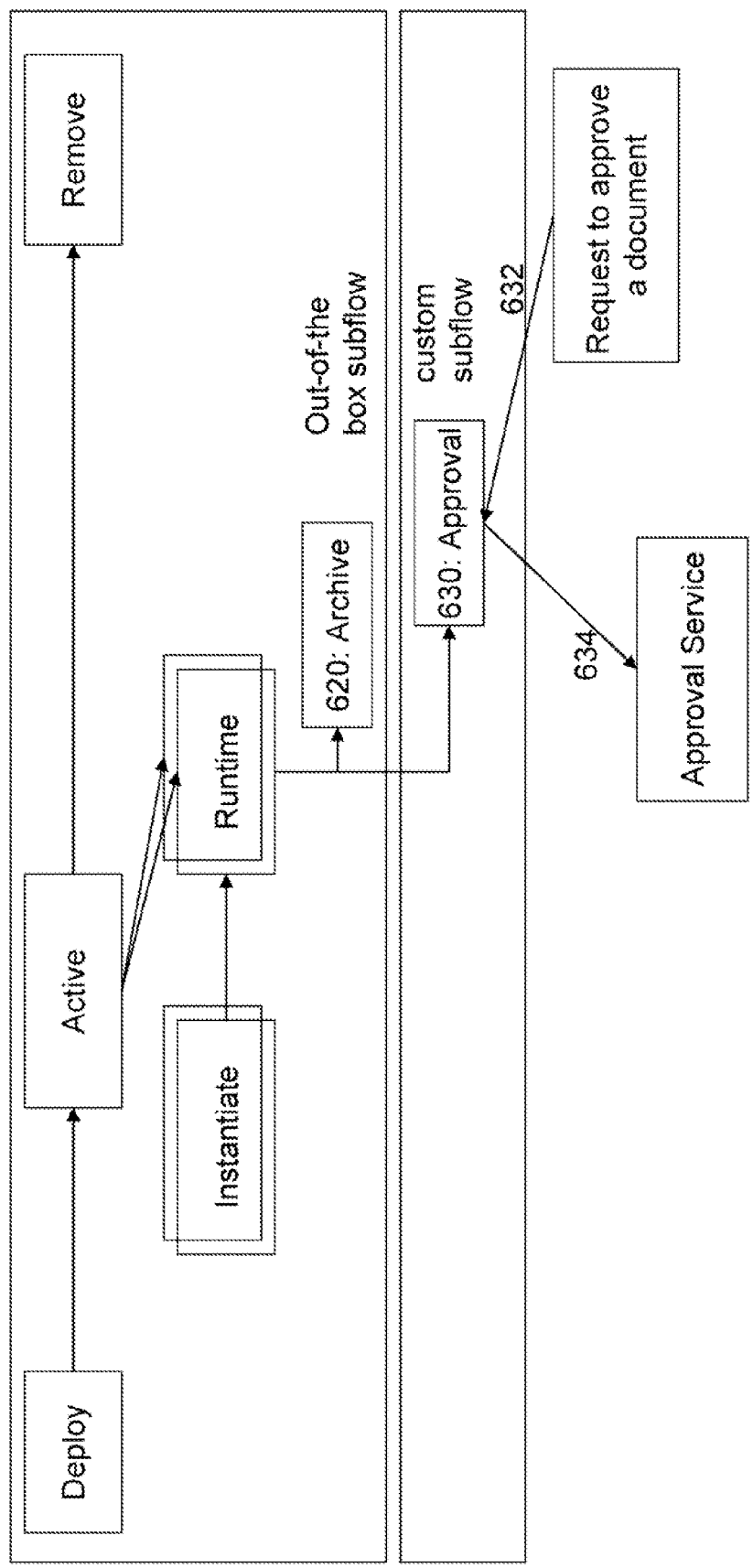
FIG. 6 illustrates a control flow for a runtime stage in accordance with an embodiment of the inventive arrangements disclosed herein.

FIG. 6 illustrates a control flow for the runtime stage including exemplarily given custom workflow steps of archiving 620 and approval 630 including a foregoing step 632 for requesting to approve a document for example, and a request 634 for approval.

In one embodiment of the invention, the following control flow is followed: A new Composite Application is to be installed and managed. The following Steps are executed in this embodiment of the invention:

1) The deployer starts the deployment GUI, a portlet to deploy the new application. The Portal access control allows only users with the needed authority to do so. The deployer fills in the needed information, especially the location of the deployment package on his disk. During this step, the deployment package will be loaded into the Server and the lifecycle Process will be deployed.

2) The lifecycle Process gets started and starts the approval step, which could be a human task or an automated step to approve the deployment of this new application. In addition to the approval, the Application owner or group will be determined (e.g. the Portal Administrator, application administrator or a different role).

Once the Portal Administrator approves the deployment of this application, the deployment stage is started. If not approved, the Application Artifacts will be removed from the system.

3) The deployment stage will be executed as an own sub-process which comes with the application itself. This deployment subprocess can use the standard deployment modules and can coordinate the deployment process of multiple artifacts, but limited by the capabilities of the deployment modules on the system. Thus, the different steps and the sequence of the deployment are under the control of the application writer, while the execution of the deployment steps is under the control of the Portal Administrator.

If required, the application may add additional deployment services that can deal with non-standard deployment steps.

4) Once the Application is deployed, the life cycle process of the Application will deploy a process referred to as Instance Creation process of the Application, and will provide a portlet to request an instance of this Application. One may think of a large application here, such as a "teamroom".

4.1) A potential Application Instance Owner can now request a new Application Instance by entering the application details in the portlet and submitting the request, which will start an Instance creation Process.

4.2) The Instance creation process will now request approval by the Application owner or in an automated task.

4.3) Once the approval is given, the Instance Creation Process will instantiate a new application instance, which also can be a complex process, it adds the requester as owner and informs the instance owner and the Application Owner.

4.4) Now the Application can be used as it was originally planned from the users.

5) If the end of lifetime of the application has been reached, the lifecycle process 300 gets input from either a Human interaction or an external task which is triggered by some timer. This lets the lifecycle process advance, and it removes the possibility to create new Application Instances. This includes the removal of the portlet and the possibility to create new Deployment Process instances.

6) Once the lifecycle process has moved forward to this state, it may inform all instance owners, that their Application has reached its end of life. Similar to the Instance Creation Process, a new Instance Deletion Process is generated and a User Interface (UI) (e.g., in the form of a portlet is presented which allows users to return/archive/upgrade their Application).

7) Once all Applications are returned, the lifecycle process will remove the Application Artifacts from the system, ending the provided embedding workflow process.

A person skilled in the art will appreciate that the foregoing description describes only a sample process flow, since due to the usage of processes, potentially all Applications may have a different workflow.

Also, while approvals could be added at many steps in the process only some of them are introduced in the above sample control flow.

The overall lifecycle process will be used on multiple systems during the overall development process. The typical stages of portal development can include integration, staging, and production.

On an integration system the various parts of an Application will be assembled together and the lifecycle process and all its subprocesses will be defined.

On a staging system the lifecycle process will be deployed the first time for testing of the application in a production-like environment. The main focus will be on non-functional aspects of the Application such as performance, high availability, resource consumption as well as the deployment process itself.

Once the application has passed the staging tests it will be deployed to the production system using the same life cycle process. Nevertheless, the dynamic resolution of the staff assignments allows, that the same process can be assigned to other persons in the two systems. Also the dynamic binding of the deployment services may also be used to get a different behavior of the same process on the two systems.

On the staging system, for example, testers may be selected to have both roles, the deployer role and the approver role, while distinct persons are used on the production system. On the staging system, some of the approval steps may be skipped at all, and replaced by automatic approval processes. The deployment services on the staging system can deploy the artifacts on other machines than the same services on the production system. Thus, adaptations to the underlying infrastructure are done automatically and these manual steps can be removed from the deployment.

A person skilled in the art appreciates that the web based application can be either a portal composite application, a SCA application constructed out of different services, or a JavaEE application. The JavaEE application can combine different artifacts, such as servlets, EJBs, services, and the like into one application.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method for performing the lifecycle management of a web based application comprising: controlling one or more of stages of a lifecycle of a web based application by a workflow driven control program, wherein in the lifecycle a workflow drives lifecycle stages of artifacts on a web application server, wherein the web application server provides a runtime environment for the web based application.

2. The method according to claim 1, wherein said stages comprise at least one of:
   deployment of said web based application;
   instantiation of said web based application;
   executing said web based application;
   updating said web based application; and,
   removing said web based application.

3. The method according to claim 1, wherein said stages comprise all of:
deployment of said web based application;
instantiation of said web based application;
executing said web based application;
updating said web based application; and,
removing said web based application.

4. The method according to claim 1, wherein said web based application is one of a portal composite application, a Service Component Architecture (SCA) application, and a JavaEE application.

5. The method according to claim 1, further comprising: an application programmer adding functional components to the workflow, which is otherwise predefined.

6. The method according to claim 1, further comprising: extending the workflow with custom stages using existing predefined services.

7. The method of claim 1, further comprising extending the workflow with custom stages and custom services needed for the custom stages.

8. An electronic data processing system for performing the lifecycle management of a web based, wherein said electronic data processing system comprises hardware and computer executable code digitally encoded in a non-transitory storage medium, said computer executable code operable to be executed by the hardware to control one or more of stages of a lifecycle of a web based application by a workflow driven control program, wherein in the lifecycle a workflow drives lifecycle stages of artifacts on a web application server, wherein the web application server provides a runtime environment for the web based application.

9. The system according to claim 8, wherein said stages comprise at least one of:
deployment of said web based application;
instantiation of said web based application;
executing said web based application;
updating said web based application; and,
removing said web based application.

10. The system according to claim 8, wherein said stages comprise all of:
deployment of said web based application;
instantiation of said web based application;
executing said web based application;
updating said web based application; and,
removing said web based application.

11. The system according to claim 8, wherein said web based application is one of a portal composite application, a Service Component Architecture, (SCA) application, and a JavaEE application.

12. The system according to claim 8, wherein said electronic data processing system is configured to extend the workflow with custom stages using existing predefined services.

13. The system of claim 8, wherein said electronic data processing system is configured to extend the workflow with custom stages and custom services needed for the custom stages.

14. A computer program product for performing the lifecycle management of a web based application, wherein said computer program product comprises:
a non-transitory storage medium;
computer executable code digitally encoded in the non-transitory storage medium, said computer executable code configured to control one or more of stages of a lifecycle of a web based application by a workflow driven control program, wherein in the lifecycle a workflow drives lifecycle stages of artifacts on a web application server, wherein the web application server provides a runtime environment for the web based application.

15. The computer program product according to claim 14, wherein said stages comprise at least one of:
deployment of said web based application;
instantiation of said web based application;
executing said web based application;
updating said web based application; and,
removing said web based application.

16. The computer program product according to claim 14, wherein said stages comprise all of:
deployment of said web based application;
instantiation of said web based application;
executing said web based application;
updating said web based application; and,
removing said web based application.

17. The computer program product according to claim 14, wherein said web based application is one of a portal composite application, a Service Component Architecture (SCA) application, and a JavaEE application.

18. The computer program product according to claim 14, further comprising:
computer executable code configured to extend the workflow with custom stages using existing predefined services.

19. The computer program product of claim 14, further comprising: computer executable code configured to extend the workflow with custom stages and custom services needed for the custom stages.

* * * * *